April 19, 1966 K. BODENRODER 3,246,899

RECORD CABINET CONSTRUCTION

Filed Jan. 8, 1963

INVENTOR
KARL BODENRÖDER
BY McGlew and Toren
ATTORNEYS

United States Patent Office 3,246,899
Patented Apr. 19, 1966

3,246,899

RECORD CABINET CONSTRUCTION

Karl Bodenroder, Frankfurt am Main, Germany, assignor to Record Automaten A.G., Vaduz, Liechtenstein Filed Jan. 8, 1963, Ser. No. 250,132
7 Claims. (Cl. 274—2)

This invention relates in general to record players and a cabinet arrangement therefor and particularly to a new and useful record player cabinet construction including an arrangement for storing a plurality of records in the cabinet beneath mechanism for automatically selecting a record from the storage means and for playing the record directly above the storage means.

The present invention is a continuation-in-part of application Serial No. 735,842, filed May 16, 1958, now Patent No. 3,085,805, by the present inventor and is particularly directed to a cabinet construction for employment with the mechanism set forth in detail in the copending application.

A feature of the present invention is the arrangement of cabinet to accommodate an automatic mechanism for lifting a selected record and playing a selected side thereof and to means for accommodating a plurality of records in a rack disposed below the mechanism. In accordance with one feature of the invention, a selection control is provided on the cabinet at the forward top end thereof which may be aligned in a number corresponding to the record which is to be selected in a rack accommodated in alignment with the control, but at a location adjacent the lower end of the cabinet. The operating mechanism is such that when a record is selected the carriage is moved under the control of the automatic mechanism to pick up the selected record and to orient the record in accordance with the side of the record which has been selected for playing by the automatic control mechanism.

A further feature of the cabinet construction is the provision of a pivotal door mounted alongside a sliding control for record selection. The door advantageously includes space thereon for recording the contents of the records which are contained in a selected rack. The cabinet advantageously includes an embodiment in which the rack may be removed and a selection card on the hinge cover of the cabinet removed with the record rack for replacement along with a new rack with new record selections.

With a cabinet constructed in accordance with the invention, the upper portion of the cabinet advantageously includes means to accommodate a sliding control member arranged for lateral movement at the top end of the cabinet directly above a rack containing the records which is positioned within the cabinet. The overall record player cabinet construction and mechanism arrangement permits the arrangement and storage of a plurality of records directly in the record player for selection by an automatic mechanism which includes means to pick up the selected record and to play the appropriate side. Thus, the record may be stored within the cabinet directly below the operating mechanism, and a person need not handle the records once they are placed in the storage rack.

Accordingly, it is an object of the invention to provide an improved record player cabinet arrangement.

A further object of the invention is to provide a record player cabinet including means for accommodating a sliding selector control mechanism along the length of the upper portion of the cabinet and for accommodating a plurality of records within a rack disposed beneath the control mechanism.

A further object of the invention is to provide a record cabinet including an automatic mechanism for selecting individual records which is located at the upper portion of the cabinet and means in the bottom of the cabinet for accommodating a rack for a plurality of such records.

A further object of the invention is to provide a record cabinet having an automatic mechanism for selecting a given record and a given side of a record which is located in the upper portion of the cabinet and means for accommodating a removable rack for association with the mechanism in the lower portion thereof.

A further object of the invention is to provide a record player cabinet construction including a sliding selector mechanism accommodated within an upper recessed portion of the cabinet which is movable in a scanning manner along the length of the cabinet for selecting a record for playing purposes and including a hinged cover member for closing this portion of the cabinet having means thereon for identifying the records which are selected by the scanning member.

A further object of the invention is to provide a record cabinet construction which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figures 1, 2, 3, 4:
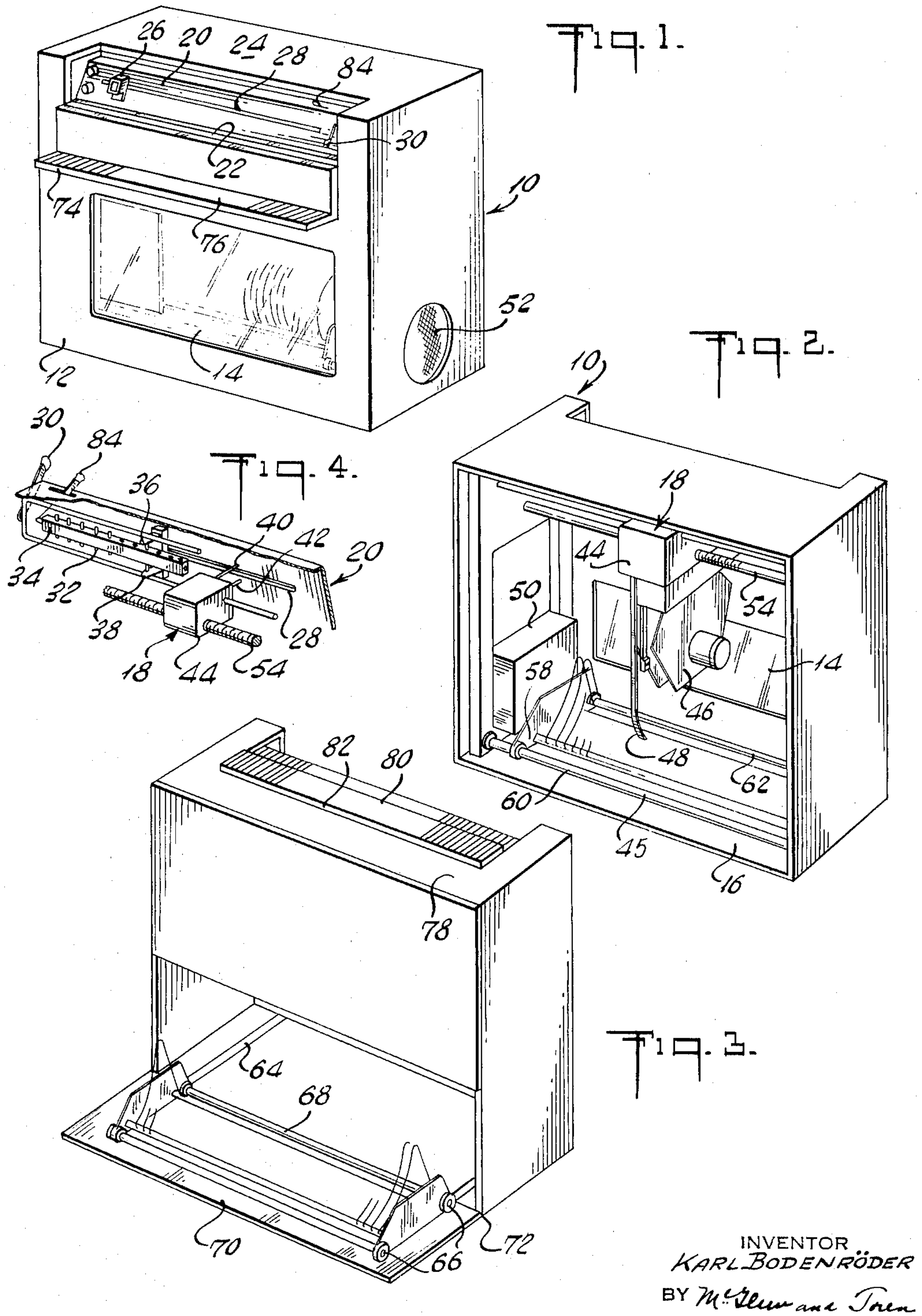
FIG. 1 is a front perspective view of a record player cabinet constructed in accordance with the invention.
FIG. 2 is a rear perspective view of the record player cabinet indicated in FIG. 1.
FIG. 3 is a rear perspective of another embodiment of the invention.
FIG. 4 is a somewhat schematic perspective view of the record selection mechanism for the record player constructed in accordance with the invention.

Referring to the drawings in particular, the invention embodied therein includes a record player cabinet construction generally designated 10 comprising a substantially block-shaped casing or housing having a front wall 12 which, in the embodiment indicated, includes a transparent front window 14 arranged adjacent a lower record storage space 16.

In accordance with the invention, the cabinet 10 includes means to support an automatic record selection mechanism generally designated 18 having a selection dial 20 which is mounted within an opening 22 formed in the forward wall 12 and a portion of the top wall 24. The selection dial 20 advantageously includes a card or plate having numerical indications corresponding to a record to be selected and a scanning member 26 is provided which moves backwardly and forwardly in a slot 28 defined in the dial portion 20.

The details of the selection mechanism are advantageously the same as those fully disclosed in copending application Serial No. 735,842, filed by the present inventor on May 16, 1958, now Patent No. 3,085,805. Generally speaking, the automatic record selection and control mechanism 18 is set when the scanning member 26 is moved into alignment with a number indicating the record to be selected and a lever 30 is actuated either upwardly or downwardly to depress or elevate control pin members 32 displaceably mounted in a block 34 at the rear of the dial 20 and within the cabinet. The lever 30 is moved either upwardly or downwardly in accordance with whether the right or the left hand side of the record is selected for playing. This upward or downward movement is translated by means of projecting members 36 and 38 connected to the lever 30, for example, to the pins 32 to either displace them upwardly or downwardly in the block 34 in accordance with which direction (upwardly or downwardly) the projecting members 36 and 28 are displaceable.

The displacement of the pins 32 either upwardly or downwardly is sensed by the displacement of suitable sensing elements 40 and 42 carried by a movable carriage 44. The carriage 44 has automatic mechanism actuated by the elements 40 for lifting a selected record from a rack 45 which rack accommodates a plurality of such records.

The carriage 44 advantageously carries a turntable 46 which includes means for clamping a record thereon and for revolving the record for playing purposes after the record is delivered to the turntable 46 by a lifting arm 48. The arm 48 engages the rear edge of the record and lifts it by pressing it against a transparent plate 50 which moves into alignment with the record along with the carriage 44. The lifting is sufficient to place the record into association with the mechanism for clamping it to the turntable 46 and when the playing of the record is completed, mechanism carried by the carriage 44 is effective to release the record and permit lowering thereof by the arm 48 back onto the rack 45.

The interior of the cabinet also includes means for mounting a speaker 50 including a speaker opening which is covered by a soft screen 52 on the exterior of the cabinet. Suitable electrical connections (not shown) are made to the record playing turntable 46, the control mechanism carried by the carriage 44 and the speaker 50. Thus, it can be seen that the cabinet 10 includes the arrangement for accommodating the selection mechanism 18 in a position above a rack 46 which in turn may accommodate a plurality of the records in a minimum amount of space for playing by the mechanism without ever being touched by an operator.

The carriage 44 advantageously is moved backwardly and forwardly above the record rack 46 by any suitable mechanism such as, for example, a rotatable screw 54, or the mechanism such as disclosed more fully in application Serial No. 735,842, filed by the present inventor on May 16, 1958. In the embodiment indicated, the records are always lifted in the same manner by the arm 48 and the turntable 46 is suspended on a pivot from the carriage 44 which rotates the turntable in accordance with whether the keys 32 are depressed upwardly or downwardly.

A feature of the construction is that the record rack 46 may be either removable or of rigid fixed construction. The fixed construction indicated in the embodiment shown in FIG. 2 includes end plates 45 which are secured to rods 60 and 62 which are permanently affixed within the cabinet at the lower end thereof.

In the embodiment indicated in FIG. 3, however, the cabinet is advantageously provided with tracks 64 and the record rack is provided with wheels 66 so that a rack 68 may be slid into and out of the cabinet when a rear panel door 70 is pivoted downwardly on a hinge 72 formed at the lower end at the rear of the cabinet. In some instances, a panel door, such as the door 70, is also provided in the front of the cabinet rather than the transparent window 14.

A further feature of the cabinet construction is the provision in the embodiment of FIG. 1 of an angle hinge cover member 74 which covers the recess 22 in the front upper portion of the cabinet at the location of the selector mechanism. The angle hinge cover advantageously includes a frame 76 for accommodating removable cards for indicating the contents of the record corresponding to the numbers which are indicated on the selector dial 20.

In FIG. 3, an alternate embodiment is indicated in which the selector mechanism is located directly on the front wall of the cabinet and a top wall 78 is provided with a hinge panel cutout 80 having a frame 82 to indicate the record contents.

Thus, the invention provides a cabinet construction for records which includes means for accommodating a fixed or a removable rack carrying a multiplicity of records and provides an arrangement which includes a selector mechanism for actuating automatic means for selectively withdrawing a selected record from the rack, for playing the record and thereafter returning the record to the rack. The cabinet arrangement permits either the permanent or temporary storage of a sufficient number of records for continuous playing within a cabinet in which the records may be selected and played. The cabinet design is such that the operating mechanism is arranged over the racks for the records and, hence, the space requirements are well suited for employment in a home as a piece of furniture.

In some instances it may be necessary to cancel all of the records selected by the automatic mechanism after being set by the scanner 26. In such instance a cancel lever 84 is used to put all of the displaced pins 32 back in a neutral position. The lever 84 is connected to the pins by mechanism (not shown) but known per se.

While specific embodiments of the invention have been shown and described in detail to illustrate the application of the inventive principles, it will be understood that the invention may be embodied otherwise without departing from such principles.

What is claimed is:

1. A record cabinet construction comprising a substantially block-shaped housing, a selector dial mounted at the upper end of the front of said housing including a member movable across said dial to scan said dial, and means for accommodating a plurality of records for selection in said cabinet beneath said selector dial, including a record rack extending across said cabinet, said cabinet having a front wall with an opening therein for viewing said record rack.

2. A record cabinet according to claim 1, wherein said cabinet includes a recessed portion adjacent the top and front walls thereof, a hinged panel member closing said recess portion, said selector dial being located in said recess portion.

3. A record cabinet according to claim 1, including automatic record playing mechanism suspended in said record cabinet at the upper end thereof above said record rack.

4. A record cabinet construction comprising a substantially block-shaped housing, a selector dial mounted at the upper end of the front of said housing including a member movable across said dial to scan said dial, means for accommodating a plurality of records for selection in said cabinet beneath said selector dial, and a bottom wall having a track defined thereon, said record accommodating means including wheels which may ride on said track.

5. A record cabinet comprising a substantially block-shaped housing, means for supporting a plurality of records on edge at the lower interior of said housing, a carriage supporting a turntable above said records for movement back and forth thereabove, means to move said carriage to overlie a selected record, record selection dial means located across the front of said housing including a dial supported on the front exterior of said housing for indicating a record to be selected from said rack, a displaceable pin for each record arranged to overlie the corresponding record in the racks, means for displacing a pin corresponding to a record selected, and a scanning member shiftable along said dial and connected to said carriage moving means to actuate said carriage moving means to move said carriage to overlie the selected record for selecting and playing a chosen record as set by the selected pin.

6. A record cabinet construction comprising, a substantially block-shaped housing, a selector dial mounted at the upper end of the front of said housing including a member movable across said dial to scan said dial, means for accommodating a plurality of records for selection in said cabinet beneath said selector dial including a rack for holding the records in spaced parallel vertical positions, said housing having front and rear walls with at least one of said walls having an opening for access to said record rack, and a panel for closing said opening.

7. A record cabinet construction comprising, a substantially block-shaped housing, a selector dial mounted at the upper end of the front of said housing including a member movable across said dial to scan said dial, means for accommodating a plurality of records for selection in said cabinet beneath said selector dial including a rack for holding the records in spaced parallel vertical positions, said housing having front and rear walls with at least one of said walls having an opening for access to said record rack, and a panel for closing said opening, said housing including a bottom wall having a trackway defined thereon, said record rack having rollers rollable on said trackway, said panel being hinged to said cabinet adjacent said bottom wall and being pivotal outwardly therefrom to permit the rolling of said record rack off said trackway onto said panel.

References Cited by the Examiner

UNITED STATES PATENTS

| | | | |
|---|---|---|---|
| 2,475,495 | 7/1949 | Haag | 312—15 |
| 2,501,391 | 3/1950 | Karp | 274—10 |
| 2,810,582 | 10/1957 | Kuntz | 274—10 |
| 2,981,581 | 4/1961 | Karlsson | 312—15 |
| 3,085,805 | 4/1963 | Bodenroder | 274—10 |

FOREIGN PATENTS

| | | |
|---|---|---|
| 748,055 | 4/1956 | Great Britain. |

NORTON ANSHER, *Primary Examiner.*